US006542271B1

United States Patent
Gehlot

(10) Patent No.: US 6,542,271 B1
(45) Date of Patent: Apr. 1, 2003

(54) APPARATUS AND METHOD FOR REDUCING OPTICAL IMPAIRMENTS IN OPTICAL COMMUNICATIONS SYSTEMS AND NETWORKS

(75) Inventor: Narayan L. Gehlot, Sayerville, NJ (US)

(73) Assignee: Lucent Technologies Inc., Murray Hill, NJ (US)

( * ) Notice: Subject to any disclaimer, the term of this patent is extended or adjusted under 35 U.S.C. 154(b) by 0 days.

(21) Appl. No.: 09/197,073

(22) Filed: Nov. 20, 1998

(51) Int. Cl.[7] ............................................. H04B 10/00
(52) U.S. Cl. ....................................... 359/156; 359/181
(58) Field of Search ................................. 359/154, 156, 359/158, 180, 181, 188

(56) References Cited

U.S. PATENT DOCUMENTS

| 5,339,183 | A | * | 8/1994 | Suzuki | 359/181 X |
| 5,491,576 | A | * | 2/1996 | Bergano | 359/156 |
| 5,724,459 | A | * | 3/1998 | Banba et al. | 359/154 X |
| 6,198,559 | B1 | * | 3/2001 | Gehlot | 359/181 X |
| 6,263,465 | B1 | * | 7/2001 | Gehlot | 714/746 |
| 6,266,171 | B1 | * | 7/2001 | Gehlot | 359/181 |
| 6,304,353 | B1 | * | 10/2001 | Gehlot | 359/181 X |

* cited by examiner

Primary Examiner—Thomas Mullen

(74) Attorney, Agent, or Firm—John E. Curtin, Esq.

(57) ABSTRACT

The present invention is a transmitter device and related system and method for use in high speed optical transmission systems. In one exemplary embodiment of the present invention, light from a laser diode output is split into two branches of orthogonal polarization ($E_{ox}$, and $E_{oy}$) of substantially equal power. Polarization selectors coupled thereto are operable to select a specific polarization to be output to a corresponding external optical polarization modulator. A first polarization modulator, receives light from the polarization selector, for example, $E_{ox}$, and modulates URZ data from a URZ coder thereon. A second polarization modulator receives light from the second polarization selector, for example, $E_{oy}$, and modulates delayed data ($URZ_d$) representative of the URZ data from the URZ coder thereon. The URZ data and the delayed $URZ_d$ data may be combined at the transmitter, fiber channel or receiver for transmission over a single optical medium, for example, a fiber optic cable. The net delay at the receiver in the delayed $URZ_d$ data is preferably T/2, where T is a pulse period of URZ data. The first and second sets of data originating from the first and second branches of the transmitter, respectively, are uniquely added together at the transmitter, fiber or receiver in order to realize UNRZ data. With polarization dispersive optical fiber cable between the transmitter and receiver the $E_{ox}$ and $E_{oy}$ polarization signals encounter different propagation delays and arrive at the receiver separately. By changing the optical polarization delay in one or the other or both arms of the receiver, the two sets of signals are added together to realize UNRZ data.

14 Claims, 2 Drawing Sheets

Fig. 2a. Transmit URZ and URZ$_d$ all "0"s and receive UNRZ all "0s" as data

Fig. 2b. Transmit URZ and URZ$_d$ "1" and "0" and receive UNRZ as data

Fig. 2c. Transmit URZ and URZ$_d$ all "1"s and receive UNRZ all "1"s as data

APPARATUS AND METHOD FOR REDUCING OPTICAL IMPAIRMENTS IN OPTICAL COMMUNICATIONS SYSTEMS AND NETWORKS

RELATED APPLICATIONS

This application is related to co-pending U.S. patent application Ser. No. 09/197,823 entitled SYSTEM AND METHOD FOR GENERATING NRZ SIGNALS FROM RZ SIGNALS IN COMMUNICATIONS NETWORKS (Gehlot-7), and U.S. Pat. No. 6,198,559 entitled AUTOMATIC DELAY COMPENSATION FOR GENERATING NRZ SIGNALS FROM RZ SIGNALS IN COMMUNICATIONS NETWORKS (Gehlot-9), those applications having a common inventor and assignee with the instant application, and being incorporated herein by reference.

FIELD OF INVENTION

The present invention relates generally to the field of high speed optical communication and more particularly to high speed optical transmission systems utilizing dense wave division multiplexing (DWDM) and other like transmission techniques.

BACKGROUND OF INVENTION

In optical communications systems or optical networks utilizing dense wave division multiplexing (DWDM) and other optical transmission techniques, a laser diode is used to convert electrical signals to optical pulses for transmission over fiber optic cable. To a certain extent, most laser diodes have one or more of the following drawbacks when used for optical transmission, even without data modulation being applied: 1) Random optical amplitude fluctuations referred to as relative intensity noise (RIN) amplitude; 2) Random optical phase fluctuations, where the optical phase noise is also related to optical frequency noise; and 3) Random polarization fluctuations which result because of random polarization phase changes or individual random amplitude changes of polarization states or both.

In systems using optical amplifiers between transmitter and receiver, the gain from an amplifier is dependent on the state of polarization of the light entering the optical amplifier. If the optical amplifier polarization state matches with that of the polarization state of the incoming light, a maximum possible gain may be seen at the output of the light which is desirable. Prior art methods of controlling the polarization state of light entering optical amplifiers include the utilization of polarization maintaining fiber. This type of fiber is, however, significantly more costly than traditional fiber optical cable, and its usage is therefore impractical for many applications.

Data transmission in long fiber transmission paths (such as undersea or continental terrestrial cable or lightwave transmission paths) are subject to signal fading and accompanying fluctuations in the signal-to-noise ratio (SNR) that are caused by effects of polarization. In a long lightwave transmission system with optical amplifiers, the SNR can fluctuate in a random manner, which causes signal fading. Signal fading causes delays in the data transmission channel, particularly in channels with long fiber-optic transmission paths. When the SNR of a signal in such a lightwave transmission system becomes unacceptably small, a signal fade has occurred.

Signal fading and the underlying SNR fluctuations are caused by a number of polarization dependent effects induced by the optical fiber itself and other optical components (e.g., repeaters, amplifiers, etc.) along the long optical fiber transmission path. In systems using optical amplifiers between the transmitter and the receiver, the gain from an amplifier is dependent on the state of polarization (SOP) of the lightwave entering the optical amplifier. Optical amplifiers reduce the effects of signal fading and rectify the delay problem due to long fiber-optic transmission paths. For optimal signal performance, the SOP of the optical amplifier matches with that of the incoming lightwave so that a maximum possible gain is achieved at the output of the lightwave. The SOP of the lightwave is determined by the shape of the ellipse, i.e., the direction of the major axis and the ratio of the major axis to the minor axis $E_{oy}/E_{oy}$, and the phase difference $$\text{Phase}_{Polarization} = \text{phase}_x - \text{phase}_y$$

Random polarization fluctuations result because of the random polarization phase changes or individual random amplitude change of polarization states, or both. In particular, signal fading due to polarization dependent effects over long optical fiber transmission paths can be attributed to polarization dependent loss (PDL), polarization dependent gain (PDG), polarization mode dispersion (PMD) and polarization dependent hole-burning (PDHB). All of these effects impact signal transmission as a function of the particular SOP of an optical signal being propagated along the long optical fiber transmission path.

A conventional solution to rectify the channel delay problem due to SNR fading is to simultaneously launch two signals of different wavelengths and substantially orthogonal relative polarizations into the same transmission path. Since the two signals are launched with equal power and orthogonal SOPs, the overall transmitted signal is essentially unpolarized. This has the advantage of reducing the deleterious effects of the transmission fiber's non-linear signal-to-noise interactions, and signal delay caused by PDHB. Even though the average SNR performance improvement with such a transmitter can be substantial, such a system is still subject to substantial signal fading and in-channel delay. However, the two-wavelength source is still subject to SNR fading. Moreover, it is costly and a waste of power by using two wavelengths to transmit data because only half of the wavelengths carry useful information. Hardware resources such as dispersion compensation fiber, manual compensation tracking or variable dispersion compensation per channel in WDM are expensive and burdensome to implement. In particular, two-wavelength dispersion compensation technique for reduction of signal fading becomes prohibitive because information translation from one channel to another channel on a real-time basis is extremely difficult to perform due to channel ranges and non-linearities in WDM.

In addition to the above limitations which are present with the laser diode when used in connection with high speed optical communications, the fiber optic cable as used in the transmission introduces certain impairments into the data due to the non-linearities in the fiberoptic cable itself. As would be understood, the impairments may include dispersion, self phase modulation (SPM), cross phase modulation (XPM), FWM, etc.

The high speed optical communications which takes place within the optical systems and networks utilizing the laser diodes and fiberoptic cable may be transmitted using any one of a number of transmission coding techniques. Unipolar return-to-zero (URZ) and unipolar non-return-to-zero (UNRZ) techniques are commonly used in optical data transmission because of their unipolar characteristics. Since laser power is either zero or a certain positive quantity, only unipolar encoding can be implemented in fiber-optical communication systems. UNRZ is a widely used optical communication technique for laser modulation in optical communications because of its low bandwidth requirement as compared to URZ. URZ offers some advantages when used in fiberoptic systems with optical amplifiers; however, this use is at the cost of higher bandwidth.

High speed optical transmitters in the prior art have adopted one or the other coding techniques depending on a particular application and the amount of resources available, e.g., power, bandwidth, etc. The above discussed drawbacks and limitations associated with laser diodes and the corresponding optical networks are present, however, regardless of which of the coding techniques is utilized.

Accordingly, there is a need in the art for an optical transmitting device which combines advantages with respect to transmission of both the URZ and UNRZ coding techniques, while at the same time eliminating PMD, PDL, PDG, PDHB, XPM, SPM, FWM, etc.

SUMMARY OF THE INVENTION

The present invention is a transmitter device and related system and method for use in high speed optical transmission systems. In one exemplary embodiment of the present invention, light from an optical source, for example, a laser diode output is split into two branches of differing polarization type of substantially equal power, for example, orthogonal polarization ($E_{ox}$ and $E_{oy}$). Polarization selectors coupled thereto are operable to select a specific polarization to be output to a corresponding external optical polarization modulator. A first polarization modulator, receives light from the polarization selector, for example, $E_{ox}$, and modulates a first coded data type, for example, URZ data from a URZ coder thereon. A second polarization modulator receives light from the second polarization selector, for example, $E_{oy}$, and modulates delayed first coded data, for example, delayed URZ data ($URZ_d$) representative of the URZ data from the URZ coder thereon. The URZ data and the delayed $URZ_d$ data may be combined at the transmitter, fiber channel or receiver for transmission over a single optical medium, for example, a fiber optic cable. The net delay at the receiver in the delayed $URZ_d$ data is preferably T/2, where T is a pulse period of URZ data. The first and second sets of data originating from the first and second branches of the transmitter, respectively, are uniquely added together at the transmitter, fiber or receiver in order to realize a second coded data type, for example, UNRZ data. With polarization dispersive optical fiber cable between the transmitter and receiver the $E_{ox}$ and $E_{oy}$ polarization signals encounter different propagation delays and arrive at the receiver separately. By changing the optical polarization delay in one or the other or both arms of the receiver, the two sets of signals are added together to realize UNRZ data. An advantage of the present invention is that PDHB, PDL PMD and PGD are eliminated. PMD is eliminated by adjusting polarization mode delay at the transmitter, fiber, receiver or any one or more or all of the above. PDHB is reduced as $|E_{ox}$ and $E_{oy}|$ will have equal average power at the receiver as the net vector sum constitutes UNRZ. Also, because of the transmission of constant envelopes XPM, SPM and FWM are reduced. A further advantage of the present invention is that the overall bandwidth of the transmitted data is the same as UNRZ.

BRIEF DESCRIPTION OF THE DRAWINGS

For a better understanding of the present invention, reference may be had to the following description of exemplary embodiments thereof, considered in conjunction with the accompanying drawings, in which.

DETAILED DESCRIPTION

The present invention is an apparatus and method for use as, or with, a high speed optical transmitter, and which reduces the optical power penalty incurred due to polarization mode dispersion (PMD), polarization dependent hole-burning (PDHB), polarization dependent loss (PDL), self phase modulation (SPM), cross phase modulation (XPM) and FWM in dense WDM optical communications systems and networks. In order to achieve such an improvement in optical power penalty, the present invention takes advantage of a unique hybrid coding technique which enables two occurrences of identical URZ data to be transmitted (one occurrence ($URZ_d$) being delayed by a given amount) where the two transmissions are later combined to produce UNRZ data. As is explained more fully in co-pending U.S. patent application Ser. No. 09/197,823 entitled "SYSTEM AND METHOD FOR GENERATING NRZ SIGNALS FROM RZ SIGNALS IN COMMUNICATIONS NETWORKS" (Gehlot-7), which is incorporated herein by reference, this hybrid coding technique has significant advantages over the prior art in that it is an efficient way to receive UNRZ data by transmitting URZ coded data. This is significant in that URZ coded data has properties that favor optimal transmission and it is therefore desirable to be able to transmit URZ data instead of UNRZ data and still be able to realize low bandwidth requirements benefits of receiving UNRZ data.

Figure 1:
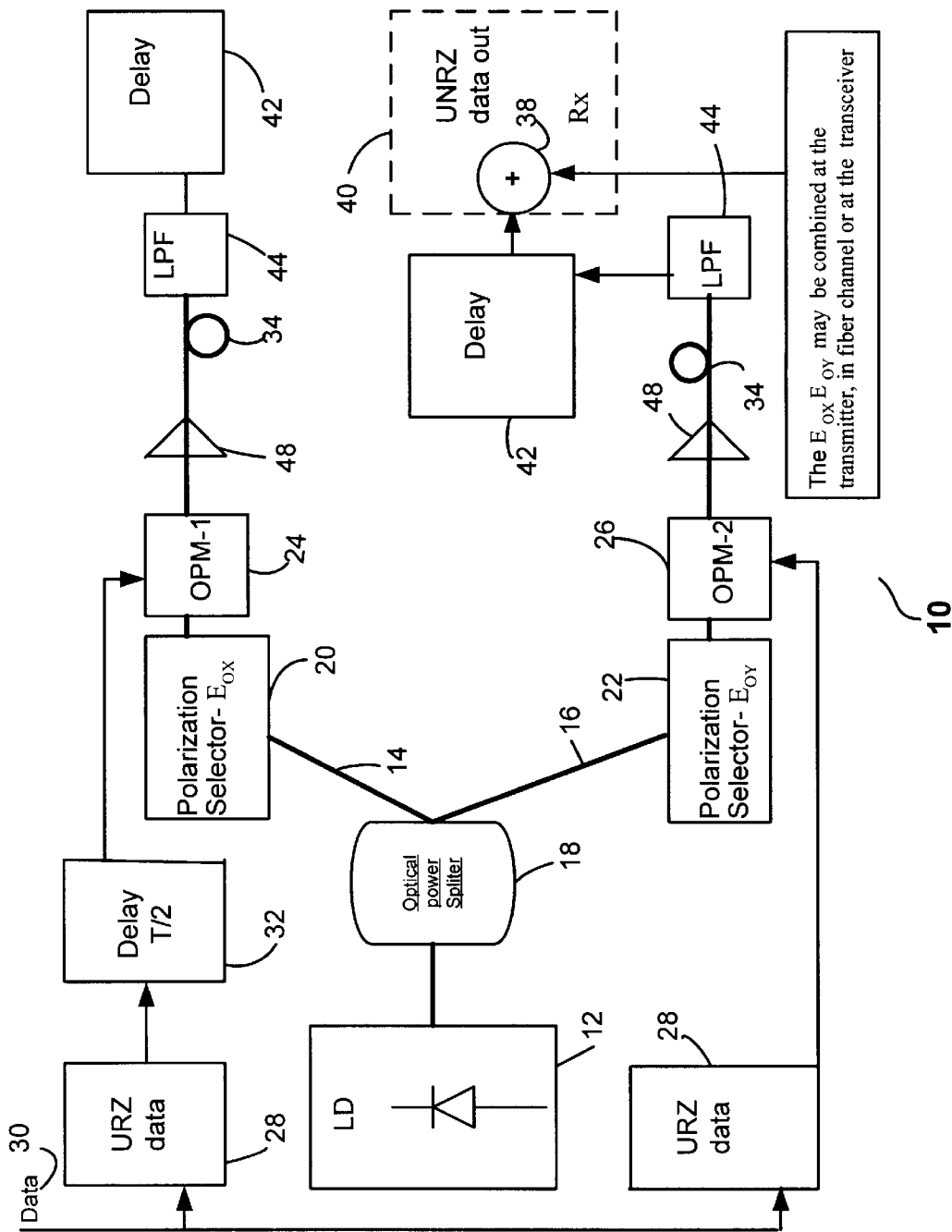
FIG. 1 shows an exemplary embodiment of an optical transmitter in accordance with the present invention.

Referring to FIG. 1, an exemplary optical transmitter is shown in accordance with the present invention. The transmitter 10 includes at least a laser diode 12. As shown, the light produced from the laser diode is split into a first branch 14 ($E_{ox}$) and a second branch 16 ($E_{oy}$) of substantially equal power using one or more conventional optical splitters 18. The first and second branches 14, 16 are coupled to a first and second polarization selector 20, 22, respectively. The polarization selectors are operable to select a specific polarization to be output to a corresponding external optical polarization modulator. As would be understood to those skilled in the art, the state of polarization of a lightwave is determined by the shape of the corresponding ellipse. That is, the direction of the major axis and the ratio of the major axis to the minor axis $E_{ox}/E_{oy}$, and the phase difference, where $Phase_{Polarization} = Phase_x - phase_y$, determine the polarization. A first external optical polarization modulator 24 receives a first type of polarized light, e.g., $E_{ox}$, from the first polarization selector 20 and modulates URZ coded data thereon from a URZ coder 28 (which receives data from a data source 30). A signal delay element 32 coupled to the URZ coder 28 produces a delay, preferably of T/2, in the transmission of the URZ data, where delayed URZ data ($URZ_d$) is input to the second external optical polarization modulator 26 to be modulated on a second type of polarized light from the second polarization selector 22, e.g., $E_{oy}$. At least one optical delay 34 is present in each of the first and second signal path branches after which the modulated $E_{ox}$ and $E_{oy}$ signals are combined at combiner 38. The combiner may be present at the transmitter, fiber channel, the receiver or any one or more or all of the above.

Note that the delay provided by signal delay element 32 as shown in the figure is normally an electrical delay. Additional optical delay elements 34 are also shown in each optical pathway. It would be understood, that additional electrical delay elements may also be placed within one or more of the optical pathways. As shown in FIG. 1, exemplary additional electrical delay elements 42 are shown proximate the combiner 38 and subsequent to filters 44, for example, low pass filters, which may also be included in one or more of the optical paths. The combination of electrical delay elements and optical delay elements are cooperatively adjusted to assure that delay of the $URZ_d$ coded signal relative to the URZ coded signal, as received at the receiver, is maintained at approximately one-half of the period of the system clock (or else one half the period of URZ pulse). It should, however, be recognized that, while the exemplary embodiment of the invention incorporates a combination of separate electrical and optical delay elements, the required delay may also be provided in a single delay element which may beoptical or electrical. Other combinations of delay elements may also be established to achieve the desired goal of a delay of the $URZ_d$ signal relative to the URZ signal at the receiver.

In the absence of any optical fiber cable between the transmitter and receiver UNRZ data is recovered by adding the two URZ signals externally or within the optical field. With polarization dispersive optical fiber cable between the transmitter 10 and receiver 40 the $E_{ox}$ and $E_{oy}$ signals encounter propagation delays and arrive at the receiver separately. By changing the polarization optical delay in one or the other or both arms of the receiver 40, these signals can be made to arrive at a receiver or other location at appropriate intervals in order to obtain UNRZ data from URZ and $URZ_d$.

As can be seen in FIG. 1, the first optical polarization modulator 24 uses URZ data and the second optical polarization modulator 26 uses $URZ_d$ data. The modulated light spectrum is kept narrow using optical polarization modulation in series. Thus, the overall optical spectrum launched into the fiberoptic cable, for example, is narrow and has a constant envelope. The narrow spectrum means less dispersion and also reduces FWM possibilities. The modulators may also utilize techniques for multiplexing and demultiplexing which are known in the prior art as disclosed, for example in issued U.S. Pat. No. 4,711,515 to Alferness, entitled Electrooptic Polarization Multiplexer/ Demultiplexer.

As is understood, in systems using optical amplifiers between transmitters and receivers, the gain from an amplifier is dependent on the state of polarization of the light. entering the optical amplifier. If the optical amplifier polarization state matches with that of the polarization state of the incoming light, a maximum possible gain may be seen at the output of the light. In the present invention, the state of polarization is now controlled with the signal. The amplifiers 48 may see one or both polarization states ($E_{ox}$ and $E_{oy}$) of polarization for amplification. If the amplifiers themselves have a technique for reducing polarization dependent gain, as disclosed for example in issued U.S. Pat. No. 5,345,331 to Bergano et al., entitled Technique for Reducing Polarization Dependent Gain in an Amplified Optical Transmission System, the disclosure of which is incorporated herein by reference, then gain stability will be increased further.

Figure 2:
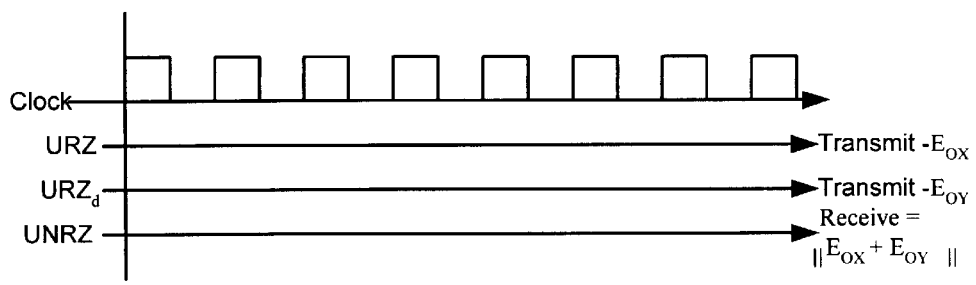
FIG. 2 shows a graphical representation of the addition of URZ and $URZ_d$ signals corresponding to modulated $E_{ox}$ and $E_{oy}$ signals, respectively, which are added together to produce UNRZ data.
Figure 2:
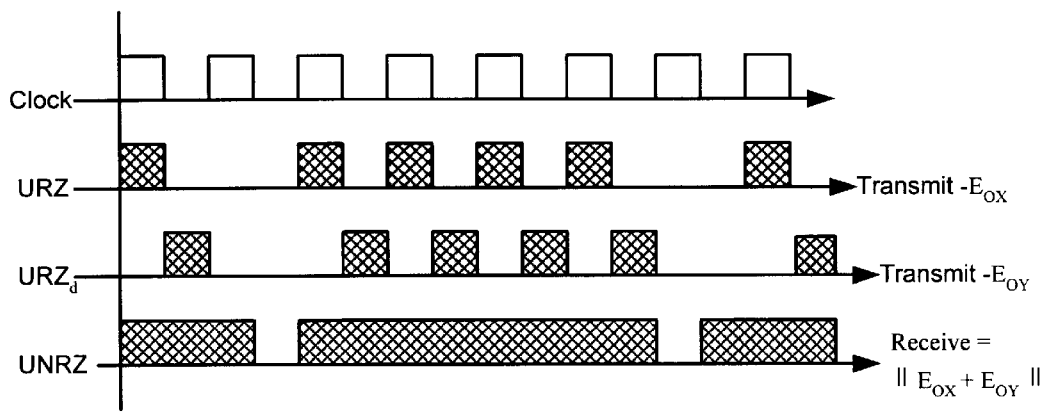
Figure 2:
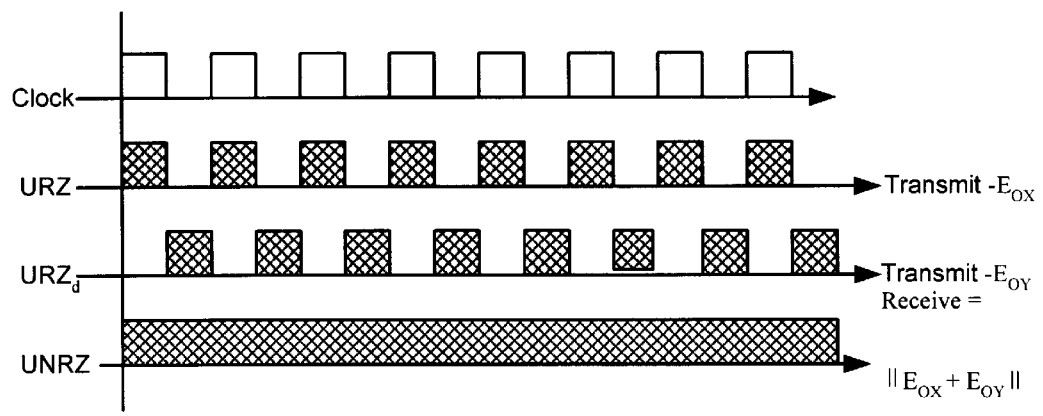

Referring to FIGS. 2A, 2B and 2C, there are shown a series of exemplary data transmissions of URZ and $URZ_d$ by a transmitter in accordance with the present invention. As can be seen, the URZ and $URZ_d$ are combined at the transmitter, receiver or along the optical path in order to realize the UNRZ data.

In general, the present invention is advantageous in that the optical power penalty incurred because of PMD, PDL, PDG, PDHB and other inherent limitations present in most laser diodes, are significantly reduced because $|E_{ox}(URZ)+ E_{oy}(URZ_d)|$ constitutes the UNRZ signal at the receiver. This optical power penalty is reduced, since a constant envelope of signal is now being transmitted. That is, even though the polarization state of the $E_{ox}$ and $E_{oy}$ may change, the overall signal being transmitted will maintain a constant polarization magnitude and a constant amplitude which translates into a constant envelope. Also, the receiver data rate is always the same as conventional UNRZ.

The present invention is unique in that a first set of data is modulated with URZ data and the second set of data is modulated with $URZ_d$ data at the transmitter to eventually obtain UNRZ data at the receiver. Thus, different coding is being used at the optical modulator of the transmitter relative to the optical receiver. The present invention is also unique in that a digital data clock or digital data clock harmonics (low or high) are not being used to modulate the optical frequency, optical phase or optical polarization which further reduces XPM, FWM and SPM. The present invention also does not modulate the optical frequency of the laser diode prior to data modulation.

The present invention thus provides a unique methodology to enable the receipt of UNRZ data through the transmission of URZ and $URZ_d$ data, where the URZ coded data has properties that favor optical transmission mediums and optical amplifiers relative to UNRZ. A simple and efficient method is also presented for controlling PMD. As explained, the present invention also eliminates the need for expensive dispersion control fiber, while at the same time eliminating the need for expensive polarization maintaining fiber. Further, manual tracking which is usually needed for dispersion compensation in the prior art is no longer needed in that it can be automated as explained in related issued U.S. Pat. No. 6,198,559, entitled Automatic Delay Compensation for Generating NRZ Signals from RZ Signals in Communications Networks, the disclosure of which is herein incorporated by reference.

From the above, it should be understood that the embodiments described, in regard to the drawings, are merely exemplary and that a person skilled in the art may make variations and modifications to the shown embodiments without departing from the spirit and scope of the invention. For example, the present invention transmitter, transmitter/ receiver system and related coding technique although described with respect to an optical communications system may also be utilized in wireless, modem, cable television and data networks or any other communication system or chip-to-chip communication within a chip or on circuit boards. In addition, application of the methodology of the invention has been described herein in terms of a preferred embodiment based on URZ and UNRZ coding of data to be transmitted in an optical communications system. It will, however, be apparent to those skilled in the art that the inventive methodology may be applied for a variety of other coding or modulation techniques applied in electrical and optical communication systems. All such variations and modifications are intended to be included within the scope of the invention as defined in the appended claims.

I claim:

1. A transmitter device for transmitting optical data on an optical carrier source, said device comprising:

a first modulator for receiving a first light input from a single source, said first light input having a first polarization state from said single source and modulating first coded data from a coder coupled thereto on said first light input;

a second modulator for receiving a second light input from said single source having a second polarization state from said single source and modulating delayed first coded data representative of said first coded data from said coder on said second light input;

at least one output port coupled to said first and second modulator for transmission of said first coded data and said delayed first coded data over an optical medium; and first and second polarization selectors coupled, respectively, prior to said first and second modulators, said polarization selectors being operable to select a polarization state being output there from.

2. The device of claim 1, wherein said first polarization state and said second polarization state are $E_{ox}$ and $E_{oy}$, respectively.

3. The device of claim 1, wherein said first polarization state and said second polarization state are orthogonal polarization states.

4. A transmitter device for transmitting optical data on an optcal carrier source, said device comprising:

a first modulator for receiving a first light input from a single source, said first light input having a fist polarization state from said single source and modulating first coded data from a coder coupled thereto on said first light input;

a second modulator for receiving a second light input from said single source, said second light input having a second polarization state from said single source and modulating delayed first coded data representative of said first coded data from said coder on said second light input, wherein a net delay of said delayed first coded data to be received at a location to be decoded is T/2, where T is a period of a first coded data pulse; and at least one output port coupled to said first and second modulator for transmission of said first coded data and said delayed first coded data over an optical medium, wherein said first coded data and said delayed first coded data are combined at a location selected from the transmitter, optical fiber channel, and receiver.

5. The device of claim 4, wherein said first and second modulators are operable to transmit a signal having a constant envelope, wherein polarization mode dispersion (PMD), polarization dependent gain (PDG), polarization dependent loss (PDL) and polarization dependent hole burning (PDHB) are thereby reduced.

6. The device of claim 4, herein said first coded data is unipolar return-to-zero (URZ) data and said delayed first coded data is delayed $URZ_d$ data.

7. The device of claim 6, wherein said URZ data and said delayed URZ data are combinable into unipolar non-return-to-zero (UNRZ) data.

8. The device of claim 4, wherein said delay is produced from a delay element selected from the group consisting of electrical delay element, optical delay element and a combination of electrical and optical delay element.

9. The device of claim 4, wherein said delay is operable for different wavelengths in a single fiber and different fibers.

10. The device of claim 4, wherein delay elements for producing said delay are at a location selected from the group consisting of: transmitter, fiber optic channel and receiver.

11. The device of claim 4, wherein the length of said medium is adjustable to compensate for polarization mode dispersion.

12. The device of claim 4, wherein said optical source is a laser diode.

13. A method of transmitting optical data, said method comprising the steps of:

receiving a fist light input of a first polarization state from an optical source at a first modulator and modulating first coded data from a coder coupled thereto on said first light input;

receiving a second light input from said optical source at a second polarization modulator and modulating delayed first coded data representative of said first coded data from said coder on said second light input, wherein said first coded data is unipolar return-to-zero (URZ) data and said delayed first coded data is delayed $URZ_d$ data and said URZ data and said delayed $URZ_d$ data are combinable into unipolar non-return-to-zero (UNRZ) data, and wherein a net optimum end-to-end delay from transmiter to receiver of said delayed unipolar return-to-zero (*$URZ_d$) signal is T/2, where T is a period of a URZ pulse; and transmitting said UNRZ data over an optical medium.

14. The method of claim 13, further including the step of inputting said first and second light input to first and second polarization selectors, said polarization selectors being operable to select a polarization type being output therefrom.

* * * * *